(12) United States Patent
Young et al.

(10) Patent No.: US 10,166,629 B2
(45) Date of Patent: Jan. 1, 2019

(54) EXOTHERMIC BONDING FOR CYLINDER BLOCK INSERTS

(71) Applicant: CATERPILLAR INC., Peoria, IL (US)

(72) Inventors: Taylor Douglas Young, Peoria, IL (US); Daniel Thomas Cavanaugh, Chillicothe, IL (US); Curtis John Graham, Peoria, IL (US); Luis A Vazquez, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 392 days.

(21) Appl. No.: 14/887,027

(22) Filed: Oct. 19, 2015

(65) Prior Publication Data

US 2017/0107941 A1    Apr. 20, 2017

(51) Int. Cl.
  *B23K 23/00*   (2006.01)
  *F02F 7/00*    (2006.01)
  *B23K 20/16*   (2006.01)
  *F02F 1/10*    (2006.01)

(52) U.S. Cl.
  CPC .......... *B23K 23/00* (2013.01); *B23K 20/165* (2013.01); *F02F 7/0095* (2013.01); *F02F 2001/106* (2013.01); *F02F 2007/0063* (2013.01)

(58) Field of Classification Search
  CPC ...... B23K 20/165; B23K 23/00; F02F 7/0095
  See application file for complete search history.

(56) References Cited

U.S. PATENT DOCUMENTS

| | | | |
|---|---|---|---|
| 5,429,173 A | 7/1995 | Wang et al. | |
| 5,671,532 A | 9/1997 | Rao et al. | |
| 6,148,515 A | 11/2000 | Suzuki et al. | |
| 7,513,236 B2 | 4/2009 | Miyamoto et al. | |
| 2013/0081589 A1* | 4/2013 | Ostein ................. | B23P 6/02 123/193.1 |
| 2014/0165396 A1* | 6/2014 | Graham ............... | F02F 7/0082 29/888.01 |

FOREIGN PATENT DOCUMENTS

JP    20004436021 B2    3/2010

* cited by examiner

*Primary Examiner* — Kevin A Lathers
(74) *Attorney, Agent, or Firm* — Procopio, Cory, Hargreaves & Savitch LLP

(57) ABSTRACT

A method for manufacturing an engine block is disclosed. In embodiments, the method includes forming an expansion hole in a block body of the engine block that encircles an engine block bore at a head face of the engine block. The method also includes placing an insert into the expansion hole, the insert including an insert body. The method further includes placing a reaction material between the insert and the block body. The method yet further includes forming an insert bond layer between the insert and block body using the reaction material. The method still further includes forming an insert bore through the insert body.

14 Claims, 5 Drawing Sheets

EXOTHERMIC BONDING FOR CYLINDER BLOCK INSERTS

TECHNICAL FIELD

The present disclosure generally pertains to an engine block, and is directed toward inserts exothermically bonded to the cylinder block.

BACKGROUND

Internal combustion engines operate at high temperatures and pressures. During operation, various areas of the engine block, such as areas on the top deck around cooling passages and the cylinder bores, may erode or be worn. The erosion and wear may result in coolant leaks and may reduce the operating life of the engine block.

U.S. Pat. No. 5,429,173 to Wang et al. discloses a solid material bonded to a metal cast thereagainst by means of a metallurgical diffusion bond. The solid material is coated with a latent exoergic coating which coating reacts exothermically to produce intermetallic phases at the surface of the solid when the metal is cast thereagainst. The heat generated by the intermetallicaly-phase-formation reaction promotes the diffusion bond.

The present disclosure is directed toward overcoming one or more of the problems discovered by the inventors or that is known in the art.

SUMMARY OF THE DISCLOSURE

A method for manufacturing an engine block is disclosed. In embodiments, the method includes forming an expansion hole in a block body of the engine block at a top deck of the block body, the expansion hole encircling an engine block bore at a head face of the top deck, the engine block bore extending into the block body from the head face. The method also includes placing an insert into the expansion hole, the insert including an insert body, the insert body generally matching the shape of the expansion hole. The method further includes placing a reaction material between the insert and the block body. The method yet further includes forming an insert bond layer between the insert and block body using the reaction material. The method still further includes forming an insert bore through the insert body.

An engine block for an internal combustion engine is also disclosed. In embodiments, the engine block includes a block body, an insert, and an insert bond layer between the block body and the insert. The block body includes a top deck, a plurality of engine block bores, and an expansion hole in the block body. The top deck includes a head face. The plurality of engine block bores includes a cylinder bore extending into the block body from the head face and a cooling passage extending into the block body from the head face adjacent to the cylinder bore. The expansion hole encircles an engine block bore of the plurality of engine block bores at the head face. The insert includes an insert body located in the expansion hole and an insert bore extending through the insert body and aligned with the engine block bore. The insert bond layer metallurgically bonds the insert to the block body at the expansion hole.

DETAILED DESCRIPTION

The systems and methods disclosed herein include an engine block and a method for manufacturing the same. In embodiments, the engine block includes an expansion hole encircling an engine block bore, such as a cylinder bore or a coolant passage, at the head face of the engine block and an insert located in the expansion hole that is metallurgically bonded to the block body of the engine block. The inserts may include corrosion resistant materials to reduce or prevent pitting, erosion, or corrosion around the engine block bores. In some embodiments, the expansion hole is machined into the block body during a remanufacturing process where pitting, erosion or corrosion has occurred. The insert is then located in the expansion hole, thus extending the operating life of the engine block. In embodiments, the metallurgical bond prevents the insert from shifting in, rotating in, or falling out of the expansion hole. The metallurgical bond may be formed by an exothermic reaction, which may provide enough heat to form the metallurgical bond without damaging the block body around the expansion hole.

Figure 1:
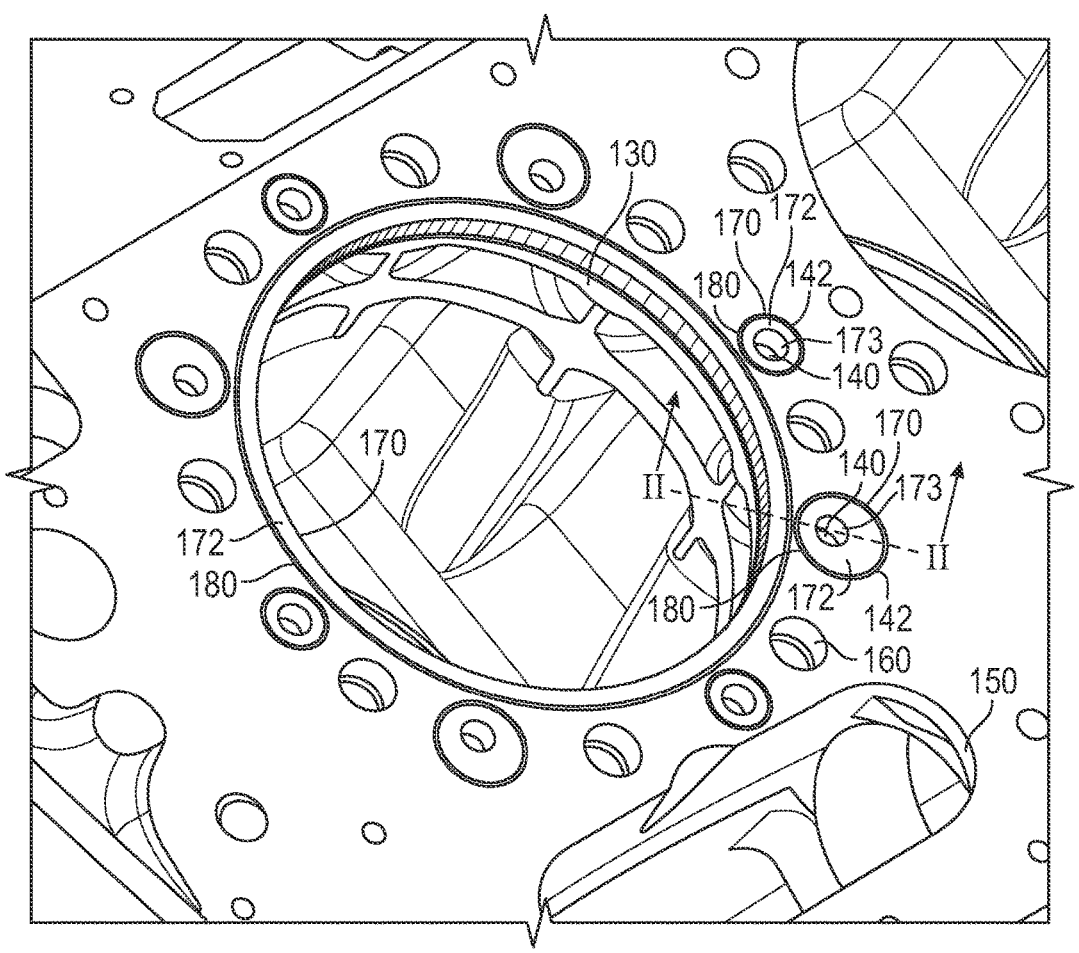
FIG. 1 is a perspective view of a portion of an engine block.

FIG. 1 is a perspective view of a portion of an engine block 100. Engine block 100 may include a block body 110, a top deck 120, bores, lifter windows, one or more expansion holes, one or more inserts 170, and one or more insert bond layers 180. Block body 110 may be a cast iron block formed with various features of engine block 100 therein, such as the bores and lifter windows 150.

Top deck 120 is located along the top portion of block body 110. Top deck 120 includes one or more head faces 122. The bores are formed in the block body 110, such as by casting or machining The bores generally extend into the block body 110 from the head face(s) 122. The bores may include cylinder bores 130, coolant passages 140, and bolt holes 160.

Cylinder bores 130 extend into the block body 110 and are formed and sized to receive the cylinders of the engine. Cylinder bores 130 each include a cylinder bore diameter. The cylinder heads are attached to block body 110 at the head faces 122. In some embodiments, cylinder bores 130 are arranged in a 'V' configuration and top deck 120 includes two head faces 122. In other embodiments, cylinder bores 130 are arranged in an in-line configuration and top deck 120 includes a single head face 122. Other configurations may also be used.

Coolant passages 140 may be located adjacent cylinder bores 130 and are configured to provide coolant to cool block body 110. Each coolant passage 140 may include a coolant passage diameter. The size of the coolant passage diameter may be determined by the amount of coolant needed to cool the block body 110.

Bolt holes 160 may also be located adjacent cylinder bores 130. Bolt holes 160 are configured to secure the cylinder head(s) to the block body 110 over the cylinder bores 130. The bolt holes 160 are sized based on the fasteners used to secure the cylinder head(s) to the block body 110. The bolt holes 160 may be threaded.

Lifter windows 150 may be aligned along a side of the head face(s) 122. Each lifter window 150 may be located between a cylinder bore 130 and an edge of a head face 122.

Each expansion hole is located in the top deck 120 adjoining and circumscribing a bore at the head face 122, and is sized to receive and be bonded to an insert 170. Expansion holes may be flat-bottomed holes, such as counterbores, or may be angled bottom holes, such as countersinks Some expansion holes may encircle the adjoining bore without being coaxial to the bore. Expansion holes may include, for example, cylinder expansion holes 132 and passage expansion holes 142.

While the embodiment illustrated has the cylinder bore 130 encircled by a cylinder expansion hole 132 and each coolant passage 140 encircled by a passage expansion hole 142, an engine block 100 in accordance with this invention may include, inter alia, any combination of expansion holes encircling one or more cylinder bores 130, one or more coolant passage 140, or one or more of each.

An insert 170 is located within each expansion hole and is joined to the block body 110 by an insert bond layer 180. Each insert 170 includes an insert body 172 and an insert bore 173. The insert body 172 for each insert 170 is configured to match the shape of the expansion hole that it is located in. The insert body 172 may include a cylindrical shape, a frustoconical shape, or any other shape that matches the shape of the expansion hole. The insert bore 173 for each insert 170 extends through the insert body 172 and aligns with the adjoining bore. The location of the insert bore 173 in the insert body 172 depends on the location of the adjoining bore and may or may not be coaxial to the insert body 172.

The insert bond layer 180 may be a metallurgical bond formed by an exothermic reaction ignited between the block body 110 and the insert body 172. The insert bond layer 180 metallurgically joins the insert 170 to the block body 110 at an interface there between. The insert bond layer 180 may include materials from the insert body 172, materials from the block body 110, and residual reaction materials from the exothermic reaction that forms the insert bond layer 180.

Figure 2:
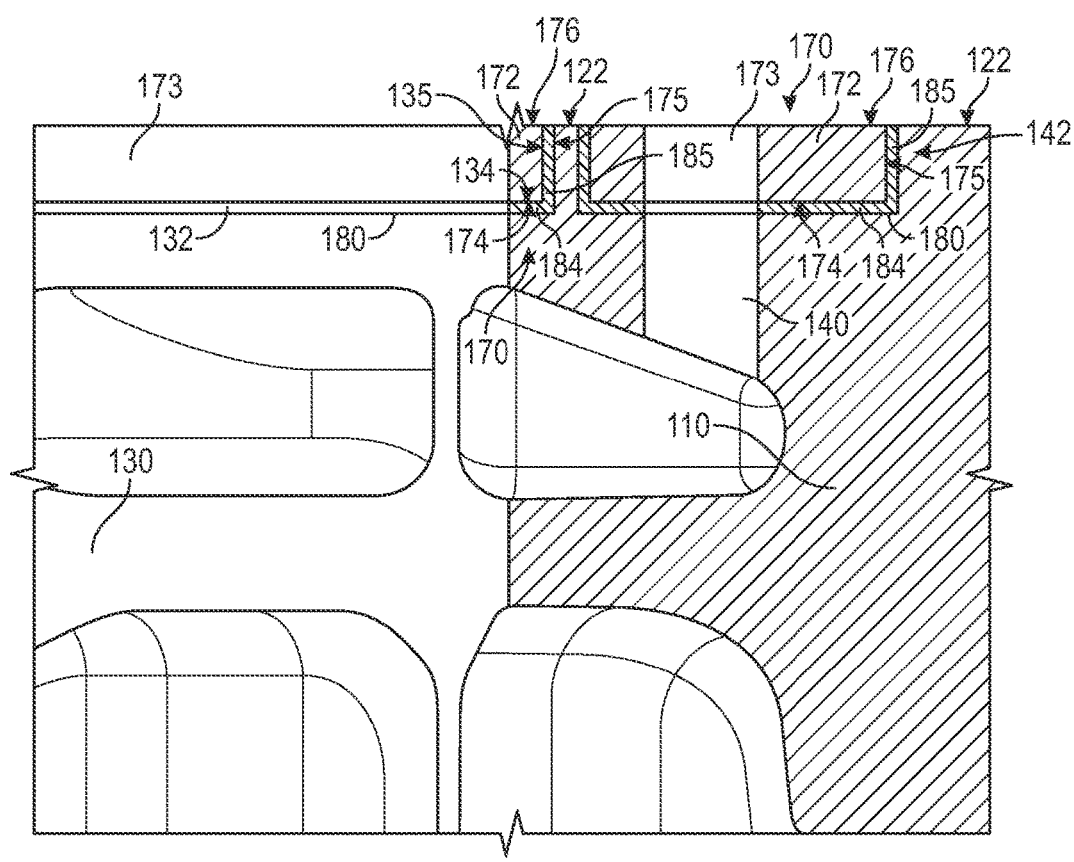
FIG. 2 is a cross-section view taken along the line II-II of FIG. 1.

FIG. 2 is a cross-section view of a portion of the engine block 100 taken along the line II-II of FIG. 1. Referring to FIG. 2, the insert body 172 is sized to fit within the expansion hole, such as the cylinder expansion hole 132 or the passage expansion hole 142. The cylinder expansion hole 132 may include a cylinder bottom surface 134 and a cylinder side surface 135. In the embodiment illustrated, the cylinder bottom surface 134 is a flat-bottom surface of the cylinder expansion hole 132. In other embodiments, the cylinder bottom surface 134 is a frustoconical surface, for example to form a countersink. The cylinder side surface 135 may be a cylinder, such as a right circular cylinder.

The passage expansion hole 142 may include a passage bottom surface 144 and a passage side surface 145. In the embodiment illustrated, the passage bottom surface 144 is a flat-bottom surface of the passage expansion hole 142. In other embodiments, the passage bottom surface 144 is a frustoconical surface. The passage side surface 145 may be a cylinder, such as a right circular cylinder.

The insert 170 may include an insert bottom surface 174, an insert side surface 175, and an insert top surface 176. In the embodiment shown in FIG. 2, the insert bottom surface 174 is a flat disk shaped surface. In other embodiments, the insert bottom surfacee 174 is a frustoconical surface. The insert side surface 175 may be a cylinder, such as a right circular cylinder. The insert top surface 176 may be a flat disk shaped surface and may be flush with the head face 122.

The insert bond layer 180 may include a bottom surface bond layer 184, a side surface bond layer 185, or both. The bottom surface bond layer 184 may be a metallurgical bond formed by an exothermic reaction ignited between the insert bottom surface 174 and the bottom surface of the expansion hole, such as the cylinder bottom surface 134 or the passage bottom surface 144. The bottom surface bond layer 184 bonds the insert 170 to the block body 110 at the interface between the insert bottom surface 174 and the bottom surface of the expansion hole. The bottom surface bond layer 184 may include materials from the insert body 172, materials from the block body 110, and residual reaction materials from the exothermic reaction that forms the bottom surface bond layer 184.

The side surface bond layer 185 may be a metallurgical bond formed by an exothermic reaction ignited between the insert side surface 175 and the side surface of the expansion hole, such as the cylinder side surface 135 or the passage side surface 145. The side surface bond layer 185 bonds the insert 170 to the block body 110 at the interface between the insert side surface 175 and the side surface of the expansion hole. The side surface bond layer 185 may include materials from the insert body 172, materials from the block body 110, and residual reaction materials from the exothermic reaction that forms the side surface bond layer 185.

The engine block 100 may also include a corrosion resistant coating that is applied to the head face(s) 122 and the insert top surfaces 176 to prevent pitting, erosion, and corrosion on the head face(s) 122 and on the insert top surfaces 176. The corrosion resistant coating may substantially cover the head face(s) 122.

Each insert 170 may include the same or a different material than the material of the block body 110 or the material of other inserts 170. For example, an insert 170 located in a cylinder expansion hole 132 may have different materials than an insert 170 located in a passage expansion hole 142. The inserts 170 may be formed of a corrosion resistant material and may include any metal alloy, including, for example, ferrous alloys (steels, stainless steels, or cast irons), nickel alloys, and aluminum alloys. Prior to being located in an expansion hole, each insert 170 may be treated, such as by a heat treatment or a surface treatment.

Industrial Applicability

Internal combustion engines with cast iron engine blocks may be suited for use in automobiles and in heavy duty vehicles. The engine blocks used in heavy duty vehicles may operate in harsh environments and may be subject to pitting, erosion, and corrosion in the top deck 120, such as at the head face 122 adjacent to the bores extending from the head face 122 into the block body 110.

An engine block 100 with inserts 170 formed of a corrosion resistant material may reduce or prevent pitting, erosion, and corrosion in the top deck 120, such as by protecting the cast iron material from chemical attacks caused by coolant leaks. The engine block 100 may also be remanufactured to include inserts 170 where pitting, erosion, or corrosion has occurred in the top deck 120 and to replace inserts 170 with pitting, erosion, or corrosion to extend the service life of the engine block 100.

Figure 3:
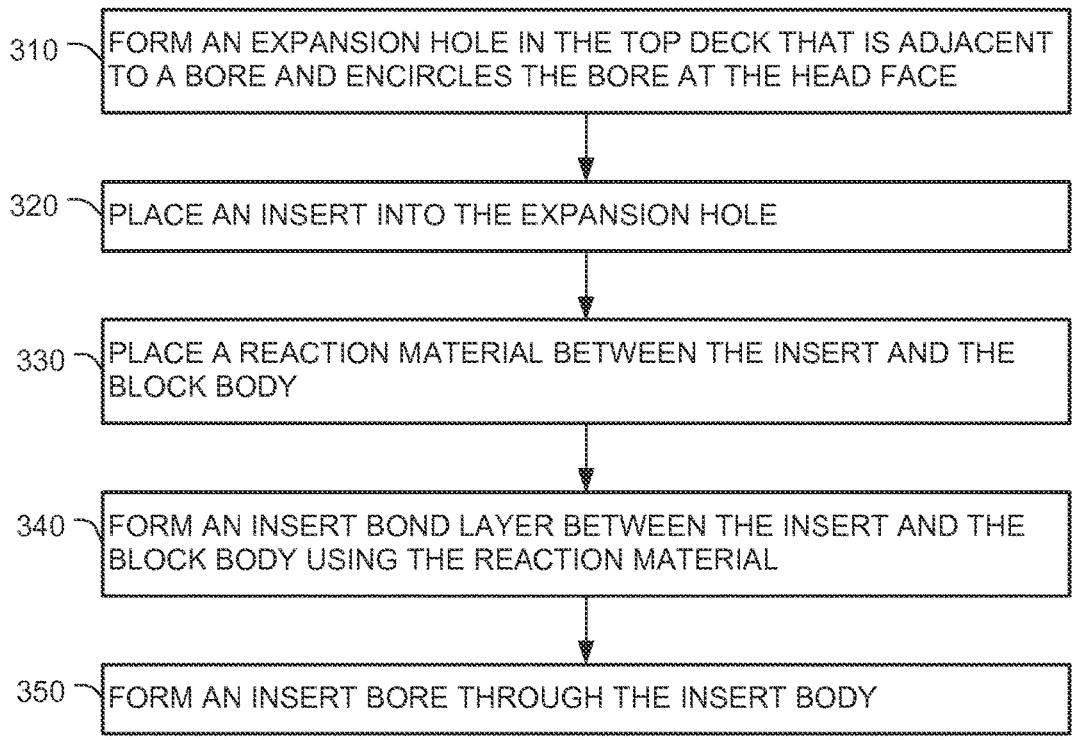
FIG. 3 is a flowchart of a method for manufacturing an engine block.
Figure 4:
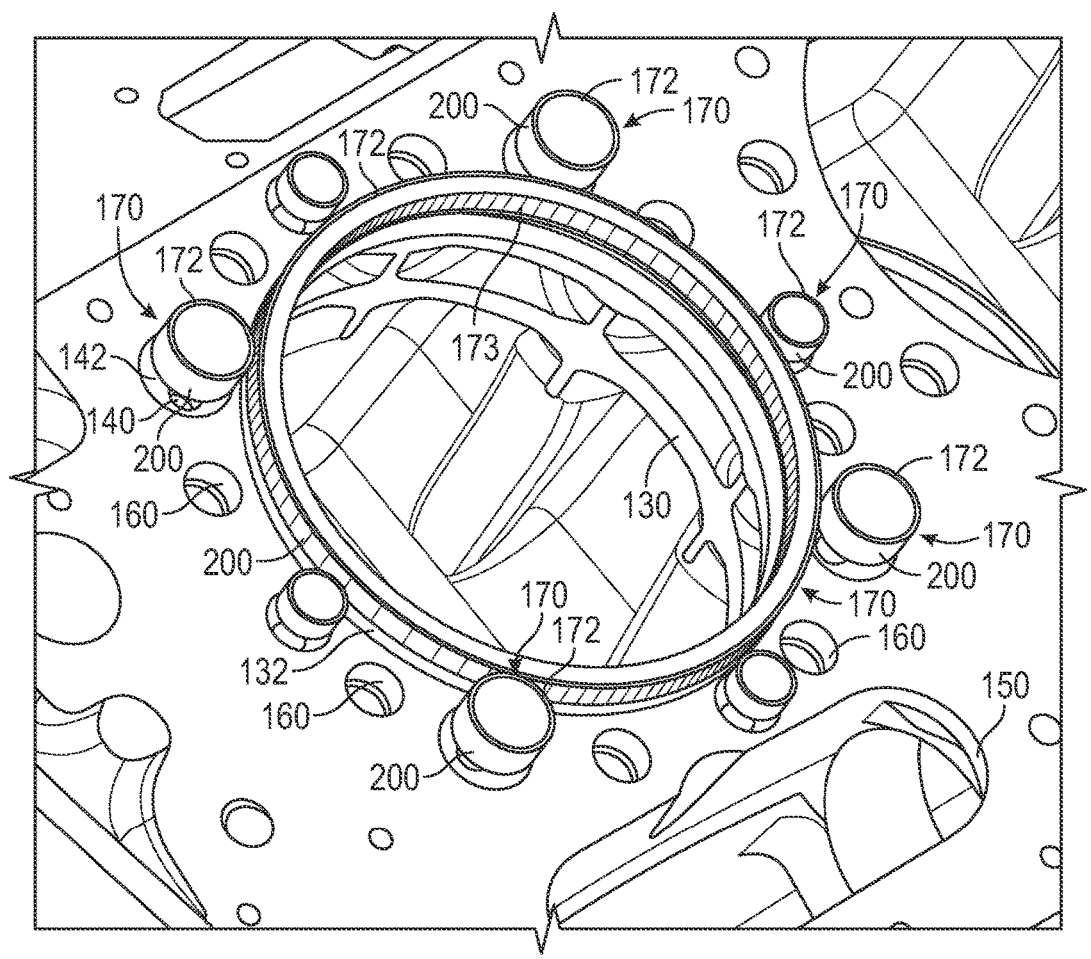
FIG. 4 is an exploded view of a portion of an engine block illustrating a manufacturing step.

FIG. 3 is a flowchart of a method for manufacturing an engine block 100. Manufacturing in accordance with embodiments of the invention can include, for example, manufacturing of a new engine block 100 or the repairing, such as remanufacturing, of a previously used engine block 100. FIG. 4 is an exploded view of a portion of an engine block 100. Referring to FIGS. 3 and 4, the method includes forming an expansion hole in the top deck 120 that is adjacent to a bore and encircles the bore at the head face 122 at step 310. The expansion hole may be, inter alia, a cylinder expansion hole 132 or a passage expansion hole 142, and the bore may be, inter alia, a cylinder bore 130 or a coolant passage 140. Forming the expansion hole may be performed during the casting process or during a subsequent machining process. In embodiments, forming the expansion hole is performed during a remanufacturing process. In these embodiments, the location and orientation of the expansion hole around the bore may depend on the location and depth of pitting, erosion, or corrosion located in the top deck 120.

The method also includes placing an insert 170 into the expansion hole at step 320. The insert 170 may be sized larger than the expansion hole and may be placed in the expansion hole with an interference fit. The insert 170 may be treated, such as with a heat treatment or surface treatment prior to being placed in the expansion hole. In some embodiments, a coating is applied to the insert 170, such as at the insert top surface 176 prior to being placed into the expansion hole.

The method further includes placing a reaction material 200 between the insert 170 and the block body 110 at step 330. Step 330 may be concurrent with step 320. Step 330 may include applying the reaction material 200 to the insert 170, such as at the insert side surface 175 and the insert bottom surface 174, applying the reaction material 200 to the top deck 120 in the expansion hole, such as at the bottom surface or side surface of the expansion hole with the reaction material 200, or a combination of the two prior to placing the insert 170 into the expansion hole. Step 330 may also include placing the insert 170 into the expansion hole with the reaction material 200 between the insert 170 and the top deck 120. Step 330 may therefore be completed concurrently with step 320. In the embodiment illustrated in FIG. 4, the insert side surface 175 and the insert bottom surface 174 are coated with the reaction material 200 prior to placing the insert 170 into the expansion hole.

Figure 5:
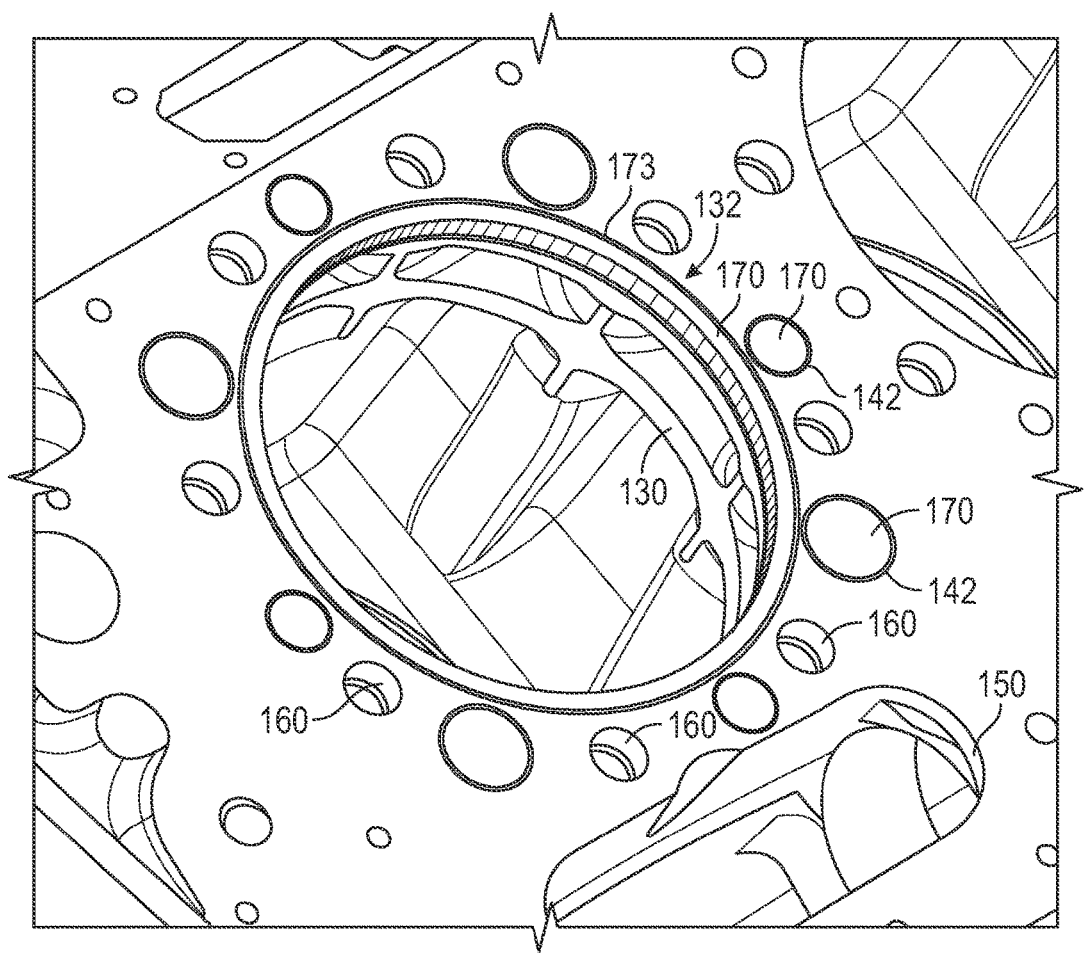
FIG. 5 is a perspective view of the portion of the engine block of FIG. 4.

FIG. 5 is a perspective view of the portion of the engine block 100 of FIG. 4. Referring to FIGS. 3 and 5, the method yet further includes forming an insert bond layer 180 between the insert 170 and the block body 110 using the reaction material 200 at step 340. Step 340 may include bonding at least a majority of an interface between the insert bottom surface 174 and the expansion hole bottom surface, bonding at least a majority of an interface between the insert side surface 175 and the expansion hole side surface, or a combination of the two with the insert bond layer 180.

Step 340 may include initiating an exothermic reaction in the reaction material 200. The exothermic reaction may be initiated electrically, thermally, or mechanically. In some embodiments, an electricity source, such as a battery, or an arc welder, provides an electrical charge the supplies the energy to initiate the exothermic reaction. In other embodiments, a heat source, such as a soldering iron, provides the heat that supplies the energy to initiate the exothermic reaction. In yet other embodiments, mechanical energy supplies the energy to initiate the exothermic reaction, such as by striking the material physically.

Once initiated, the exothermic reaction may self-propagate and generate enough heat to form the insert bond layer 180 including the bottom surface bond layer 184 and the side surface bond layer 185 (See FIG. 2). The exothermic reaction may form the insert bond layer 180 without causing enough heat to significantly affect the properties of the block body 110 and the insert 170. In some embodiments, the reaction material 200 may include, for example, thermite, a mixed powder of iron oxide and aluminum, or metals that can have an intermetallic reaction, such as nickel and aluminum.

Referring to FIGS. 1 and 3, the method still further includes forming an insert bore 173 through the insert body 172 at step 350. Forming the insert bore 173 may be performed prior to or after placing the insert 170 into the expansion hole. In embodiments, forming the insert bore 173 is performed after forming the insert bond layer 180. Step 350 may include machining the insert bore 173 into the insert body 172.

Step 350 may also include aligning the insert bore 173 with the bore, such as the cylinder bore 130 or the coolant passage 140. In embodiments where the insert bore 173 is formed after placing the insert 170 into the expansion hole, aligning the insert bore 173 with the bore may be performed while machining the insert bore 173 through the insert body 172. In embodiments where the insert bore 173 is formed prior to placing the insert 170 into the expansion hole, aligning the insert bore 173 may be performed while placing the insert 170 into the expansion hole. In these embodiments, an alignment tool may be used to maintain alignment of the insert bore 173 with the bore until the insert bond layer 180 is formed.

The method may further include a post-treatment process, such as applying a coating to the engine block 100 or post-machining the engine block 100. The coating may be applied to the top deck 120 at the head face 122 and to the insert body 172 at the insert top surface 176, such as by a wire arc spray method. Post-machining the engine block 100 may include machining the insert body 172 at the insert top surface 176 to ensure that the insert top surface 176 is level with the head face 122 or may include machine finishing the coating applied to the engine block 100.

The process illustrated in FIG. 3 is subject to many variations, including adding, omitting, reordering, or altering steps. Additionally, steps or sub-steps may be performed concurrently. For example, coating the insert 170 with the reaction material 200 may be performed before, after, or concurrently with forming the expansion hole in the top deck 120.

The preceding detailed description is merely exemplary in nature and is not intended to limit the invention or the application and uses of the invention. The described embodiments are not limited to use in conjunction with a particular type of engine block. Hence, although the present disclosure, for convenience of explanation, depicts and describes a particular engine block, it will be appreciated that the engine block in accordance with this disclosure can be implemented in various other configurations. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A method for manufacturing an engine block, the method comprising:
   forming an expansion hole in a block body of the engine block at a top deck of the block body, the expansion hole encircling an engine block bore at a head face of the top deck, the engine block bore extending into the block body from the head face;
   placing an insert into the expansion hole, the insert including an insert body, the insert body generally matching a shape of the expansion hole;

placing a reaction material between the insert and the block body;

initiating an exothermic reaction in the reaction material, the exothermic reaction forming an insert bond layer between the insert and the block body using the reaction material, and wherein the exothermic reaction provides enough heat to metallurgically bond the insert to the block body; and forming an insert bore through the insert body.

2. The method of claim 1, wherein the expansion hole is a flat-bottomed hole and includes an expansion hole bottom surface and an expansion hole side surface extending between the expansion hole bottom surface and the head face, wherein the insert is a cylinder and includes an insert bottom surface and an insert side surface, and wherein the insert bond layer includes a bottom surface bond layer that metallurgically joins the insert bottom surface to the expansion hole bottom surface and a side surface bond layer that metallurgically joins the insert side surface to the expansion hole side surface.

3. The method of claim 1, wherein placing the reaction material between the insert and the block body includes applying the reaction material to the insert body prior to placing the insert into the expansion hole.

4. The method of claim 1, wherein the insert bond layer includes material from the block body and the insert, and residual reaction material.

5. The method of claim 1, wherein forming the insert bore includes machining the insert bore through the insert body.

6. The method of claim 5, wherein forming the insert bore is performed after forming the insert bond layer and includes aligning the insert bore with the engine block bore.

7. The method of claim 1, wherein forming the insert bore is performed prior to placing the insert into the expansion hole, and wherein placing the insert into the expansion hole includes aligning the insert bore with the engine block bore.

8. A method for remanufacturing an engine block including a block body having a top deck with a head face and a plurality of engine block bores extending into the block body from the head face, the plurality of engine block bores including a cylinder bore and a cooling passage, the method comprising:

machining an expansion hole in the top deck that encircles an engine block bore of the plurality of engine block bores at the head face, wherein machining includes removing a worn portion of the engine block;

placing an insert into the expansion hole, the insert including an insert body, the insert body generally matching a shape of the expansion hole;

placing a reaction material between the insert and the block body;

initiating an exothermic reaction in the reaction material, the exothermic reaction forming an insert bond layer between the insert and the block body using the reaction material, and wherein the exothermic reaction provides enough heat to metallurgically bond the insert to the block body; and forming an insert bore through the insert body.

9. The method of claim 8, wherein the expansion hole is a flat-bottomed hole and includes an expansion hole bottom surface and an expansion hole side surface extending between the expansion hole bottom surface and the head face, wherein the insert is a cylinder and includes an insert bottom surface and an insert side surface, and wherein the insert bond layer includes a bottom surface bond layer that metallurgically joins the insert bottom surface to the expansion hole bottom surface and a side surface bond layer that metallurgically joins the insert side surface to the expansion hole side surface.

10. The method of claim 8, wherein placing the reaction material between the insert and the block body includes applying the reaction material to the insert body prior to placing the insert into the expansion hole.

11. The method of claim 8, wherein the insert bond layer includes material from the block body and the insert, and residual reaction material.

12. The method of claim 8, wherein forming the insert bore includes machining the insert bore through the insert body.

13. The method of claim 8, wherein forming the insert bore is performed after forming the insert bond layer and includes aligning the insert bore with the engine block bore.

14. The method of claim 8, wherein forming the insert bore is performed prior to placing the insert into the expansion hole, and wherein placing the insert into the expansion hole includes aligning the insert bore with the engine block bore.

* * * * *